R. HOFFMAN.
STERILIZER.
APPLICATION FILED MAR. 6, 1917.
1,258,902.
Patented Mar. 12, 1918.
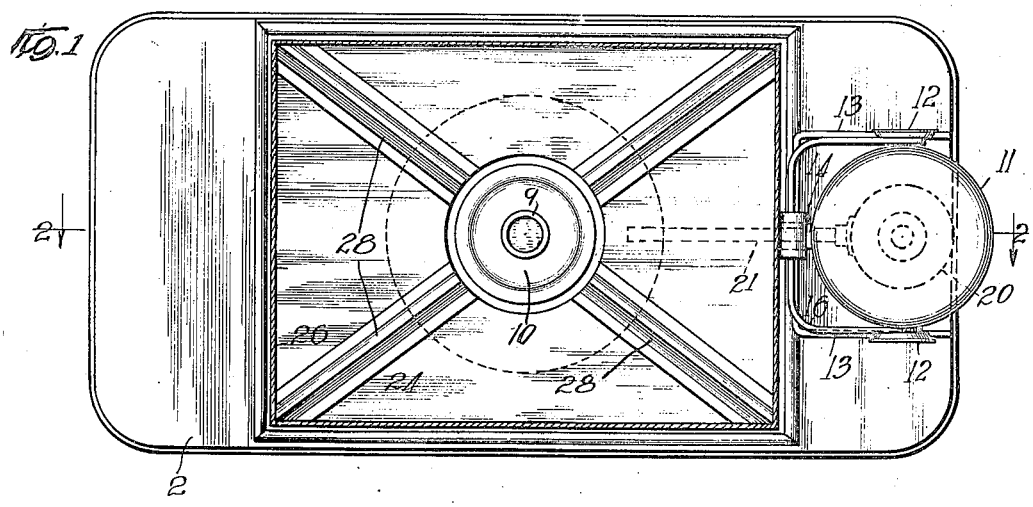
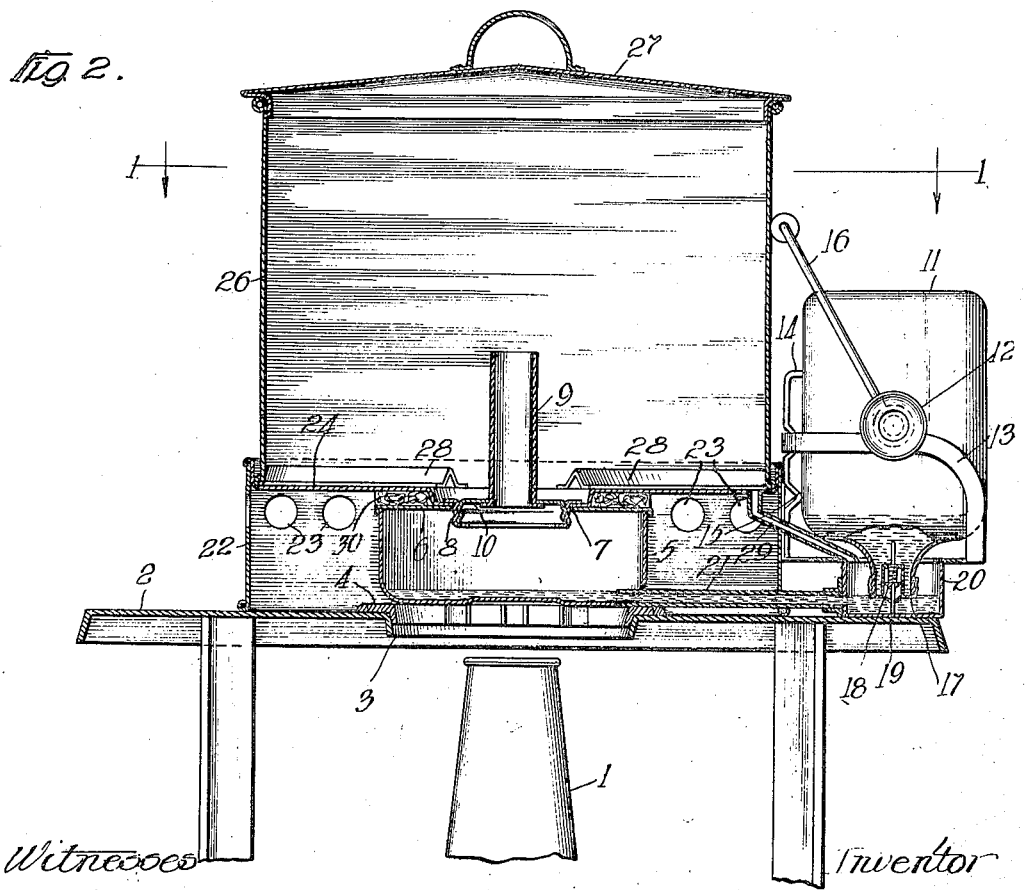
Witnesses
Inventor
Rudolph Hoffman

UNITED STATES PATENT OFFICE.

RUDOLPH HOFFMAN, OF KANKAKEE, ILLINOIS, ASSIGNOR TO SEARS, ROEBUCK AND COMPANY, OF CHICAGO, ILLINOIS, A CORPORATION OF NEW YORK.

STERILIZER.

1,258,902.

Specification of Letters Patent.

Patented Mar. 12, 1918.

Application filed March 6, 1917. Serial No. 152,609.

*To all whom it may concern:*

Be it known that I, RUDOLPH HOFFMAN, a citizen of the United States, residing at Kankakee, in the county of Kankakee and State of Illinois, have invented certain new and useful Improvements in Sterilizers, of which the following is a specification.

The object of this invention is to provide simple and effective means for conveniently sterilizing cream-separator parts, milk cans, milk-can covers, milk pails, dippers, and other articles used in and about the production, storage and utilization of milk and milk products.

In the accompanying drawings, Figure 1 is a horizontal sectional view of a sterilizer embodying the features of my invention, the view being taken in the plane of dotted line 1—1 of Fig. 2. Fig. 2 is a vertical central sectional view taken in the plane of dotted line 2—2 of Fig. 1.

The apparatus comprises a water container which may be arranged to be heated in any suitable manner in order to produce steam to be used in sterilizing the desired articles. The means herein shown for supplying heat comprises a liquid-fuel burner, the chimney of which is shown at 1 in Fig. 2. Above the chimney is a top plate 2 supported in any suitable manner, as by means of a frame 2ª. Directly above the chimney 1, the plate 2 is provided with an opening 3 which is covered by means of a grid 4 of any ordinary or suitable form. Mounted upon the grid 4 is a water kettle 5 of relatively small dimensions having a top wall 6. The wall 6 is provided with a central opening 7 through which extends an annular screw-threaded flange or ring 8. 9 is a vertical tube secured at its lower end to a closure disk 10 having a screw-thread engagement with the flange 8.

In order that steam may be quickly generated when heat is applied to the water kettle 5, it is desirable that the kettle shall contain but little water. I therefore provide means for maintaining a relatively low water level in the kettle, which means comprises a reservoir 11, provided with lateral projections 12 that rest upon brackets 13 fixed in the framework. Stop portions 14 and 15 fixed in the framework prevent the reservoir 11 from tilting on the brackets 13. 16 is a carrying bail or handle pivoted to the reservoir 11 upon the axis of the projections 12, said bail constituting means to carry the reservoir when the latter is removed from the brackets 13. The reservoir 11 has an outlet 17 which is controlled by a valve 18 of ordinary construction. Attached to said valve is a pin 19. The outlet 17 of the reservoir extends within a well 20 located upon the top plate 2. When the reservoir 11 is placed upon the supports 13, the contact of the pin 19 with the bottom of the well unseats the valve 18, thus permitting water to flow from the reservoir into the well. As soon as the water level rises to such a point that air is prevented from entering the reservoir, the flow of water from the reservoir ceases. The well 20 is connected with the lower portion of the kettle 5 through the medium of a tube 21. By the means described, a shallow layer of water is maintained in the kettle 5.

Surrounding the kettle 5 and supported upon the top plate 2 is a rectangular frame 22 having openings 23 for the escape of the products of combustion. A pan 24 is secured to and supported upon the frame 22. The pan 24 has a central opening defined by the flange 8, the parts 6, 8 and 24 being rigidly secured together. A hood or casing 26 is removably supported in the pan 24. Said hood is provided with a removable cover 27.

In order that water of condensation shall not be retained in articles placed upon the pan 24, the bottom of the pan may, if desired, be made uneven or ribbed as by securing thereto or forming therein upwardly-extending ribs 28. These ribs hold articles out of contact with the bottom of the pan sufficiently to allow water to flow from within the articles. Water of condensation returns from the pan 24 to the well 20 through a tube 29.

If desired, heat insulation of any suitable sort may be provided between the kettle 5 and the pan 24. Herein is shown a disk 30 of non-conducting material (such as asbestos) resting upon the kettle 5, said disk having a central opening through which the flange 8 extends.

In practice, articles to be sterilized are placed upon the pan 24 and the burner lighted. Steam is rapidly generated in the kettle 5 and is discharged through the tube 9 into or among the articles placed upon the pan 24. After the articles have been exposed to the action of the steam for the required length of time they are removed and others substituted.

When it is desired to sterilize a milk can or other vessel which is too large to be placed within the hood 26, said hood is lifted off the pan 24 and the vessel placed in inverted position upon the pan with the tube 9 extending into the vessel.

It will be seen that I have provided a very simple apparatus for easily and expeditiously sterilizing articles such as those used in and about the dairy.

It will be understood that the invention is not limited to the precise construction shown and described. For example, the top plate 2 may be made without a supporting frame or legs and be thus adapted to be placed upon a stove.

When it is desired to remove mineral matter which has been precipitated in the kettle 5, the tube 9 and the disk 10 are unscrewed from the flange 8. Access may then be had to the interior of the kettle.

I claim as my invention:

1. A sterilizer for sterilizing milk cans and the like having, in combination, a support, a kettle on the support, a reservoir on the support, means connecting the reservoir to the kettle and maintaining a constant level in the kettle, a frame on the support surrounding the kettle, a pan supported upon the frame and adapted to support an inverted milk can, a tube communicating with the kettle and extending centrally through the pan and adapted to extend into such inverted milk can, and a hood removably supported upon the pan.

2. A sterilizer having, in combination, a support, a water container on the support, a reservoir on the support, means connecting the reservoir to the container and maintaining a constant level in the container, a frame on the support surrounding the container, a pan supported upon the frame in a plane above the container, the latter discharging steam through an opening in the pan, and a hood removably supported upon the pan.

3. A sterilizer having, in combination, a support, a kettle on the support, a well on the support, a tube connecting the well with the lower portion of the kettle, a reservoir removably supported above the well, a pan supported above the kettle, means to discharge steam from the kettle to the space above the pan, and means to return water of condensation from the pan to the well.

4. A sterilizer having, in combination, a support, a kettle on the support, a reservoir on the support, means connecting the reservoir to the kettle and maintaining a constant level in the kettle, a frame on the support surrounding the kettle, and a pan supported upon the frame above the kettle, the latter discharging steam through an opening in the pan.

5. A sterilizer having, in combination, a support, a kettle on the support, a well on the support, a tube connecting the well with the lower portion of the kettle, a reservoir removably supported above the well, a pan supported above the kettle, a steam tube extending from the kettle to a point above the pan, a hood inclosing the space above the pan, and means to return water of condensation from the pan to the well.

6. A sterilizer having, in combination, a kettle, a pan directly above the kettle, insulation between the pan and the top wall of the kettle, an annular screw-threaded flange rigid with the pan and the kettle and defining a cleaning opening establishing communication with the interior of the kettle, and a tube having a screw-thread connection with said flange and extending above the pan.

7. A sterilizer having, in combination, a kettle, a pan secured to and located directly above the kettle, there being a cleaning opening through the pan and the top wall of the kettle, a closure for said opening, and an upwardly extending tube attached to said closure.

In testimony whereof, I have hereunto set my hand.

RUDOLPH HOFFMAN.